H. D. WILLIAMS.
NURSING BOTTLE.
APPLICATION FILED MAY 28, 1909.

950,710.

Patented Mar. 1, 1910.

WITNESSES

INVENTOR

Harry D. Williams,
BY Edward A. Laurence,
HIS ATTORNEY

UNITED STATES PATENT OFFICE.

HARRY D. WILLIAMS, OF PITTSBURG, PENNSYLVANIA.

NURSING-BOTTLE.

950,710.　　　　　　　Specification of Letters Patent.　　Patented Mar. 1, 1910.

Application filed May 28, 1909. Serial No. 498,817.

*To all whom it may concern:*

Be it known that I, HARRY D. WILLIAMS, a citizen of the United States, and residing in the city of Pittsburg, in the county of Allegheny and State of Pennsylvania, have invented or discovered new and useful Improvements in Nursing-Bottles, of which the following is a specification.

My invention consists in a new and improved nursing bottle for young children.

One form of bottle now in use is an inclosed receptacle of fixed capacity, so that, unless the quantity of food to be given the child completely fills the bottle, the remaining capacity is filled with air which the child consumes. Also, as the child consumes the milk, an increasing quantity of air enters the bottle to take the place of the milk withdrawn. When the milk is consumed, the bottle contains air, which has taken the place of the milk, which the child will suck in unless the bottle is quickly removed as soon as the milk is exhausted.

My improved bottle is provided with a movable false bottom whose position is first adjusted so that the quantity of milk to be given the child completely fills the initial capacity of the bottle, and, as the milk is consumed by the child, the false bottom moves toward the nipple end of the bottle so that nothing but the milk is contained between the false bottom and the nipple, excluding the air. This movement of the false bottom is effected by the suction caused by the child while consuming the milk and the atmospheric pressure exerted against the outer face of the false bottom.

Means are provided for adjusting the false bottom at the proper elevation to procure the desired initial capacity. Means are also provided for holding the bottle in a vertical position for filling or storing. The end of the bottle opposite the nipple is preferably open to its full diameter and provided with a perforated cap which with the other elements above referred to are readily removable for cleansing. The bottle is preferably graduated from the nipple end so that the false bottom may be readily adjusted to the desired capacity.

Figure 1:
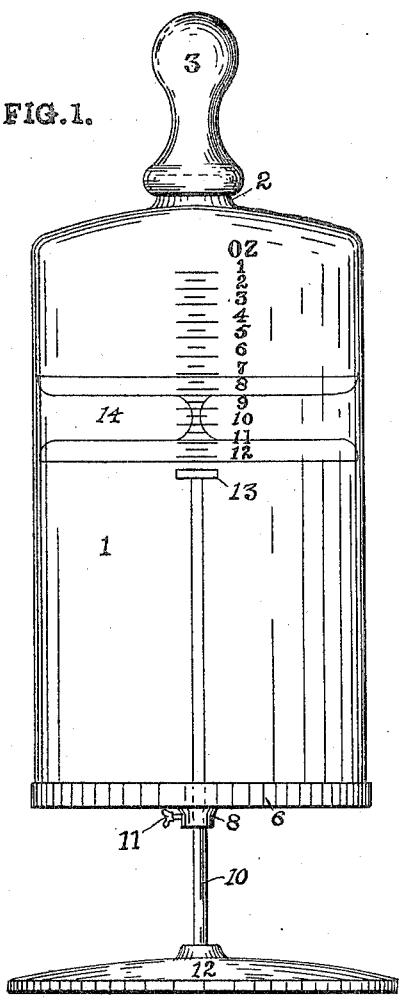
Figure 2:
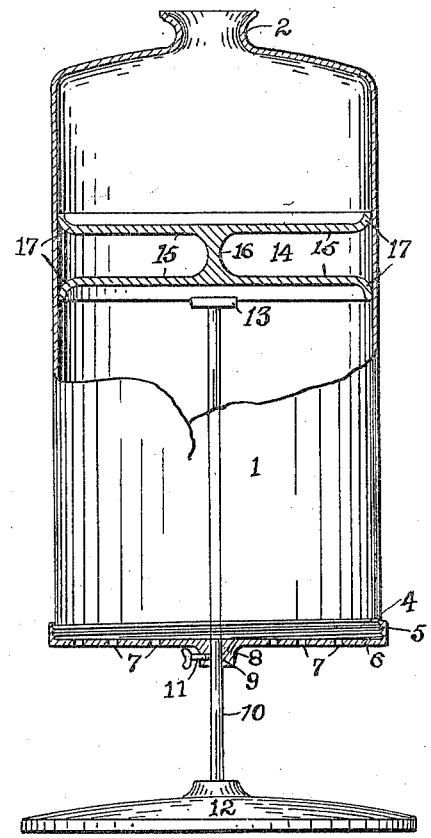

In the accompanying drawings, Figure 1 is an elevation of my improved bottle standing vertically on its base and showing the nipple attached to the neck, while Fig. 2 is a similar view of the bottle wherein it is partially broken away to show the false bottom in central cross-section and having the base cap partially cut away to show the threads on the end of the bottle.

The following is a detailed description of the drawings.

1 is the bottle, provided at one end (hereinafter call the "top") with a short nipple neck, 2, on which may be placed the nipple 3. The other or "lower" end of the bottle is preferably open to its full diameter and provided with external threads, 4, which are engaged by the internally threaded flange 5 of the bottom cap 6. Said cap is provided with air-inlets or perforations, 7—7, preferably arranged in annular series.

8 is a central boss depending from the cap 6 through which passes the central bore 9.

10 is a rod adapted to slide in bore 9 and to be secured in any desired position by means of a set screw 11 whose inner head is slightly upset to prevent its complete withdrawal from boss 8.

12 is a relatively broad base secured to the outer end of rod 10 by means of which the bottle may be placed in a vertical position for filling or storing. 13 is a small disk secured to the inner end of said rod 10.

14 is a movable false bottom, preferably composed of two hard rubber disks, 15—15 which fit the bore of the bottle 1 and are connected together axially by means of stud or support 16 which may be integral with said disks. The peripheral edges of the disks 15—15 are composed of softer rubber or similar material, as at 17—17, which trails in contact with the bore of the bottle in opposite directions, as shown, so as to prevent the passage of liquid or air past the false bottom in either direction. It is evident that the false bottom, while maintaining close contact with the bottle, will move easily in either direction. The bottle is graduated from the top downwardly, as shown in Fig. 1, to indicate the initial position of the bottom to obtain the desired capacity.

The manner of using the bottle is as follows. After its use for feeding, the cap 6 is unscrewed from the bottom of the bottle and removed with the rod 10 and the base 12. The nipple 3 is removed and the false bottom 14 is blown out through the open bottom of the bottle. It is evident that the interior of the bottle may be now cleansed and sterilized without difficulty. When the bottle is to be used for feeding purposes, the false bottom 14 is introduced from the lower end of the bottle and the cap 6 is screwed in place. The rod 10 is now pushed upwardly in the bottle until it forces the false bottom 14 into the proper position, as indicated by the graduations, to provide the desired capacity. The set screw 11 is now tightened, holding the rod 10 rigidly in place so that the bottle may be placed upright, resting on the base 12. The working capacity, which is properly adjusted, is now filled with milk or other food and the nipple 3 adjusted on the neck 2. The bottle is now given to the child. As the child draws the milk gradually from the bottle, the suction causes the false bottom 14 to move upwardly so that the portion of the bottle between the nipple and the false bottom is always filled with milk. This movement of the false bottom is assisted by the atmospheric pressure admitted through perforations 7—7 against the lower face of the false bottom. It is thus evident that no air is admitted to the working capacity of the bottle to be sucked in by the child and therefore colic is avoided. When the contents of the bottle are entirely exhausted, the false bottom has reached its innermost position in close proximity to the neck 2 and seals the same against the entrance of air through the nipple to the child's mouth. Thus a close watch need not be kept to remove the bottle as soon as the milk has been consumed.

The duplex form of the false bottom enables a perfectly tight engagement to be maintained between the bottle and the bottom so that air nor liquid may pass said bottom, and also enables the bottom to keep in proper alinement so as to slide easily along the bottle and not jam.

What I desire to claim is—

1. A nursing bottle having a bottom adapted to slide in the bore thereof and to be drawn toward the nipple end of the bottle by the gradual removal of the contents of the bottle by the child so that the quantity of food remaining in the bottle always completely fills its working capacity.

2. A nursing bottle having a bottom in air-tight contact with the bore thereof and adapted to slide in said bore and to be drawn toward the nipple end of the bottle by the gradual withdrawal of the contents of the bottle by the child so that the quantity of food remaining in the bottle always completely fills its working capacity.

3. In a nursing bottle, a false bottom in air-tight contact with the bore of the bottle and adapted to be drawn toward the nipple end of the bottle by the gradual withdrawal of the contents of the bottle by the child so that the quantity of food remaining in the bottle always completely fills its working capacity, and means for adjusting said false bottom to its position necessary to obtain the desired initial capacity.

4. In a nursing bottle, a false bottom in air-tight contact with the bore of the bottle and adapted to be drawn up with the contents of the bottle as the same are gradually withdrawn by the child, and means for admitting atmospheric pressure against the outer face of said false bottom.

5. In a nursing bottle, a false bottom in air-tight contact with the bore of the bottle and adapted to be drawn up with the contents of the bottle as the same are gradually withdrawn by the child, and a removable cap for the lower end of the bottle.

6. In a nursing bottle, a false bottom in air-tight contact with the bore of the bottle and adapted to be drawn up with the contents of the bottle as the same are gradually withdrawn by the child, a removable cap for the lower end of the bottle, and a rod passing through said cap and adapted to engage said false bottom.

7. In a nursing bottle, a false bottom in air-tight contact with the bore of the bottle and adapted to be drawn up with the contents of the bottle as the same are withdrawn by the child, a removable cap for the lower end of the bottle, a rod passing through said cap and adapted to engage the false bottom, and means for securing said rod in any desired position.

8. In a nursing bottle, a false bottom in air-tight contact with the bore of the bottle and adapted to be drawn up with the contents of the bottle as the same are withdrawn by the child, a removable cap for the lower end of the bottle, a rod passing through said cap and adapted to engage the false bottom, means for securing said rod in any desired position, and a base secured to the outer end of said rod.

Signed at Pittsburg, Pa., this 26th day of May, 1909.

HARRY D. WILLIAMS.

Witnesses:
JANE A. McPARLAND,
E. A. LAWRENCE.